(12) United States Patent
Foerster et al.

(10) Patent No.: US 9,889,866 B2
(45) Date of Patent: Feb. 13, 2018

(54) POWER SUPPLY DEVICE FOR A RAIL VEHICLE

(71) Applicant: SIEMENS AKTIENGESELLSCHAFT, Munich (DE)

(72) Inventors: Till Foerster, Fuerth (DE); Stefan Hassler, Kirchenthumbach (DE); Reiner Heilmann, Egmating (DE); Lars Loewenstein, Fuerth Vach (DE); Jens Konstantin Schwarzer, Krefeld (DE); Jean-Pascal Schwinn, Munich (DE); Thorsten Stuetzle, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 243 days.

(21) Appl. No.: 14/654,158

(22) PCT Filed: Dec. 18, 2013

(86) PCT No.: PCT/EP2013/077033
§ 371 (c)(1),
(2) Date: Jun. 19, 2015

(87) PCT Pub. No.: WO2014/095961
PCT Pub. Date: Jun. 26, 2014

(65) Prior Publication Data
US 2015/0353109 A1  Dec. 10, 2015

(30) Foreign Application Priority Data

Dec. 20, 2012  (DE) ........................ 10 2012 223 901

(51) Int. Cl.
*B60L 9/28* (2006.01)
*B61H 13/34* (2006.01)
*B60T 17/22* (2006.01)
(Continued)

(52) U.S. Cl.
CPC ............ *B61H 13/34* (2013.01); *B60L 3/0076* (2013.01); *B60L 7/26* (2013.01); *B60L 9/28* (2013.01);
(Continued)

(58) Field of Classification Search
CPC ...... B60L 1/00; B60L 9/24; B60L 9/28; B60L 11/14; B60L 11/16; B60L 11/1803;
(Continued)

(56) References Cited

U.S. PATENT DOCUMENTS 4,795,859 A  1/1989  Kato et al.
9,018,792 B2  4/2015  Still
(Continued)

FOREIGN PATENT DOCUMENTS

CN  201834010 U  5/2011
CN  102310778 A  1/2012
(Continued)

*Primary Examiner* — John Poos
(74) *Attorney, Agent, or Firm* — Laurence Greenberg; Werner Stemer; Ralph Locher

(57) ABSTRACT

The invention relates to a 1st power supply arrangement for a rail vehicle. The rail vehicle includes at least one driven car with an intermediate circuit, a brake system and an energy supply system for supplying the brake system with operating energy. In order to improve the framework conditions to ensure reliable electrodynamic braking, the energy supply system contains at least two energy supply units, for the driven car, arranged at the intermediate circuit, for the redundant energy supply to the brake system.

5 Claims, 10 Drawing Sheets

(51) Int. Cl.
*B60L 3/00* (2006.01)
*B60L 7/26* (2006.01)
*B60L 11/18* (2006.01)

(52) U.S. Cl.
CPC ......... *B60L 11/1864* (2013.01); *B60T 17/228* (2013.01); *B60L 2200/26* (2013.01); *B60L 2210/20* (2013.01); *B60L 2210/30* (2013.01); *B60L 2220/12* (2013.01); *B60L 2240/36* (2013.01); *B60L 2260/28* (2013.01); *B60T 2270/406* (2013.01); *B60T 2270/613* (2013.01); *Y02T 10/7005* (2013.01); *Y02T 10/7061* (2013.01); *Y02T 10/725* (2013.01); *Y02T 10/7241* (2013.01)

(58) Field of Classification Search
CPC ........ B60L 15/007; B60L 3/0076; B60L 7/14; B60L 7/26
USPC ............................... 307/9.1, 10.1, 10.7, 10.8
See application file for complete search history.

(56) References Cited

U.S. PATENT DOCUMENTS

| | | |
|---|---|---|
| 2006/0190157 A1 | 8/2006 | Fenske et al. |
| 2008/0143178 A1 | 6/2008 | Wiesand |
| 2011/0062778 A1* | 3/2011 | Holweck ................ B60L 7/003 307/9.1 |
| 2012/0192757 A1 | 8/2012 | Schiffers et al. |

FOREIGN PATENT DOCUMENTS

| | | |
|---|---|---|
| CN | 102548817 A | 7/2012 |
| DE | 102006051317 A1 | 5/2008 |
| DE | 102008031001 A1 | 12/2009 |
| DE | 102009008549 A1 | 8/2010 |
| EP | 2399800 A2 | 12/2011 |
| WO | 2008052696 A1 | 5/2008 |

\* cited by examiner

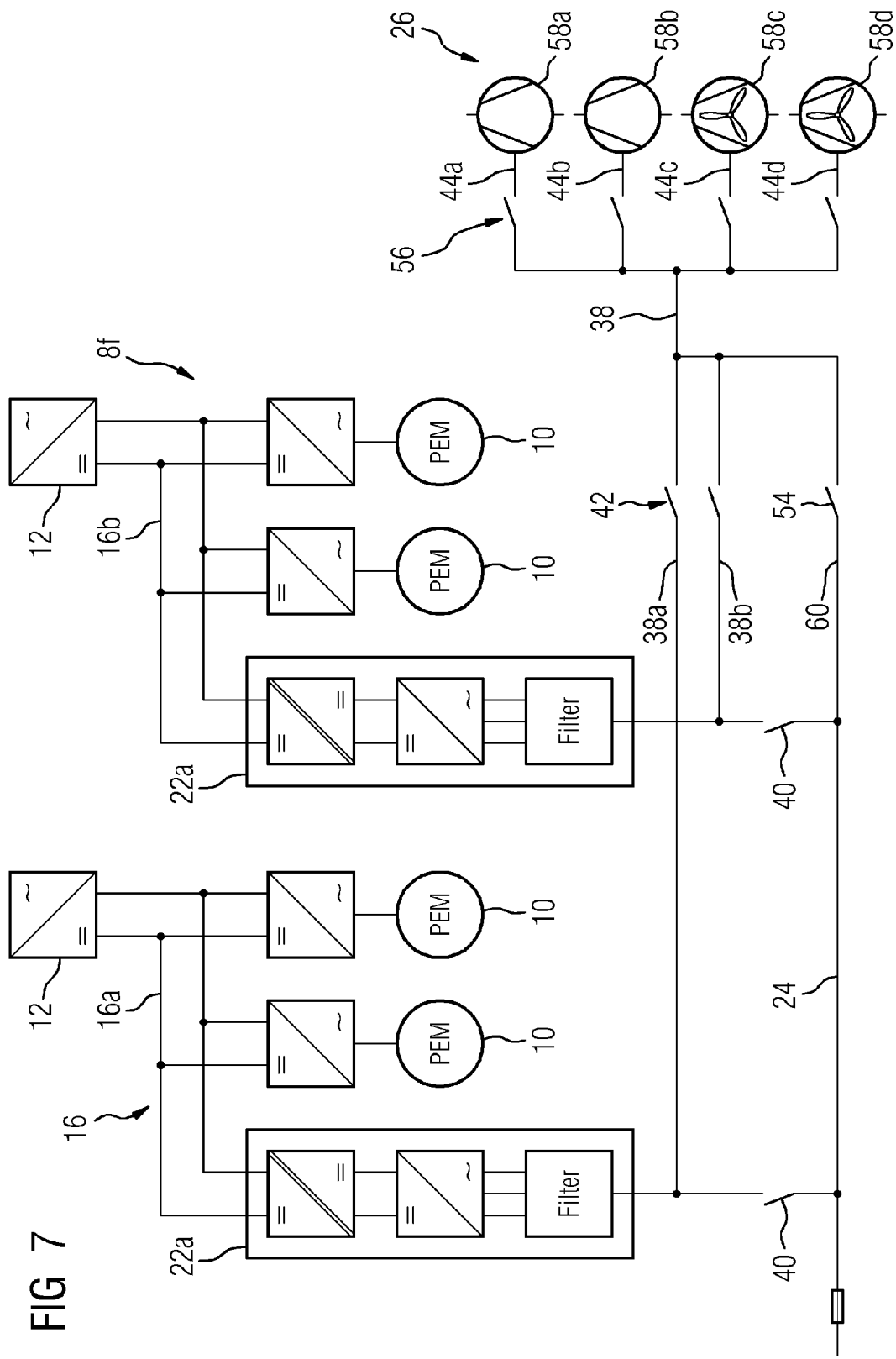

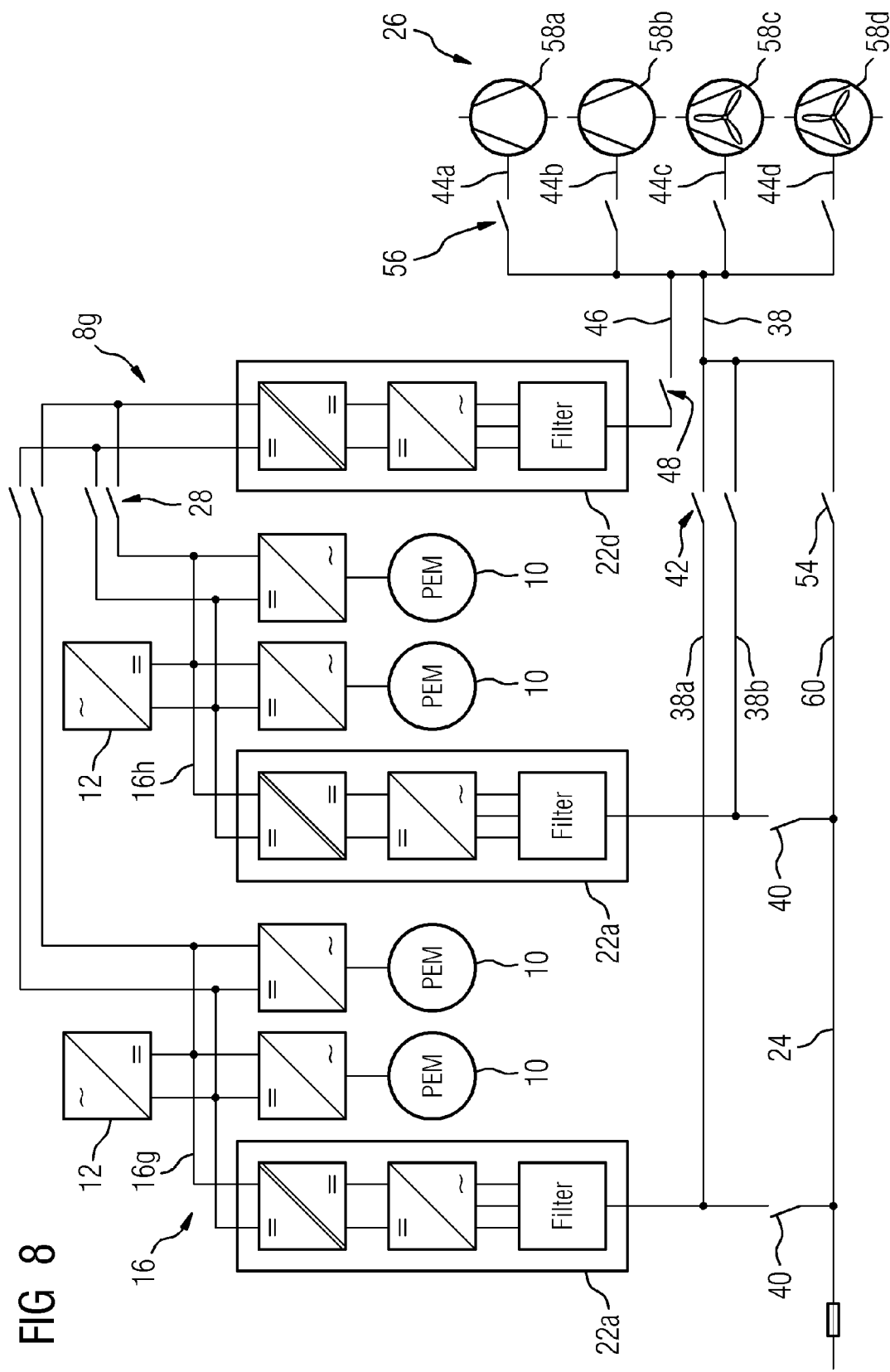

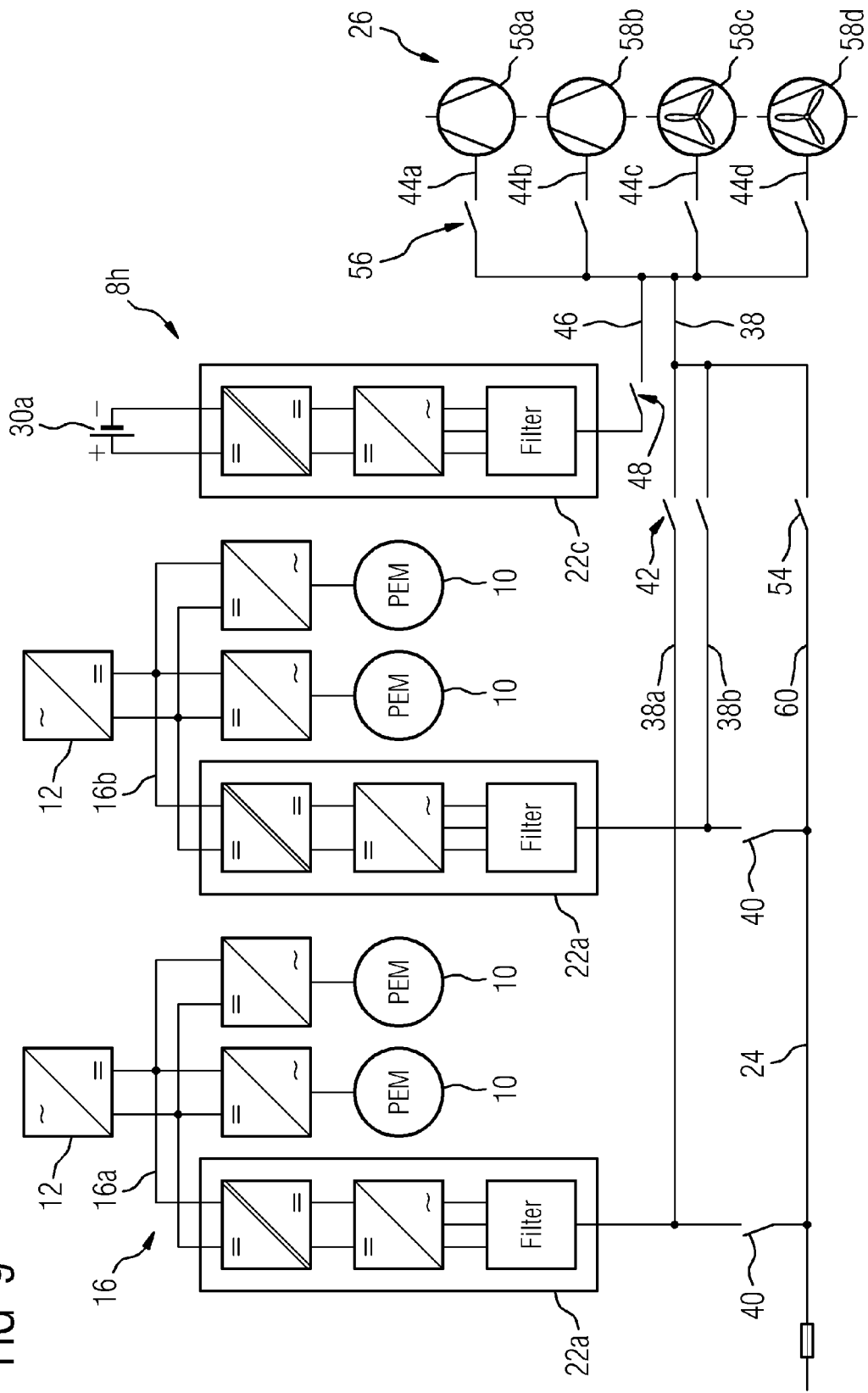

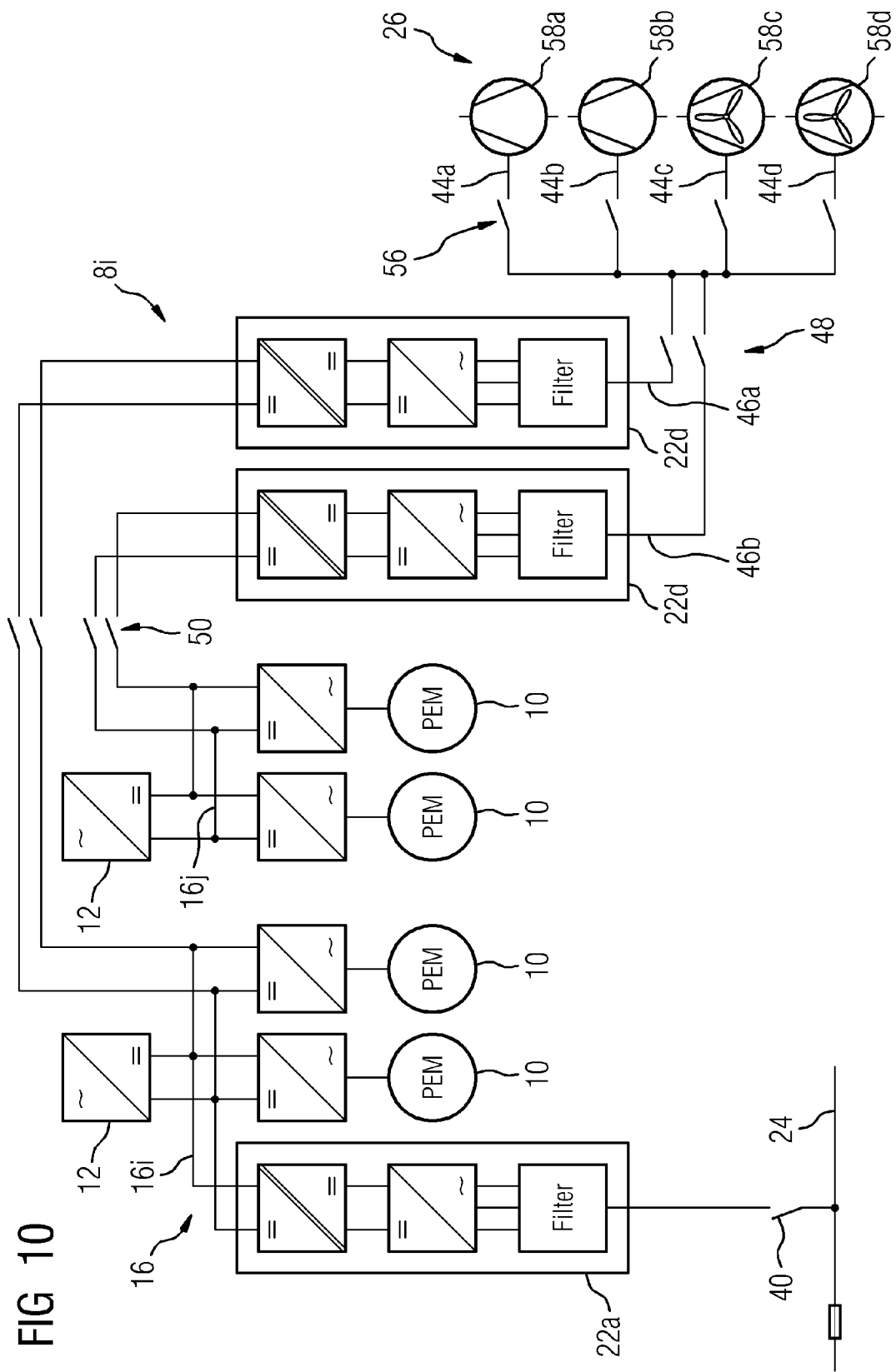

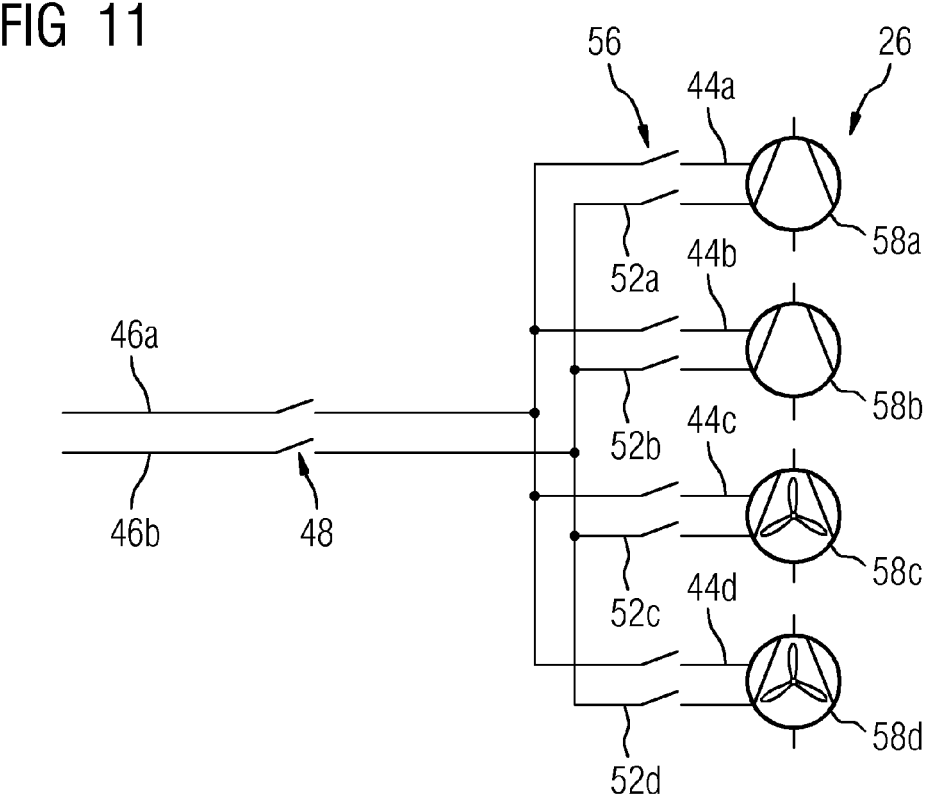
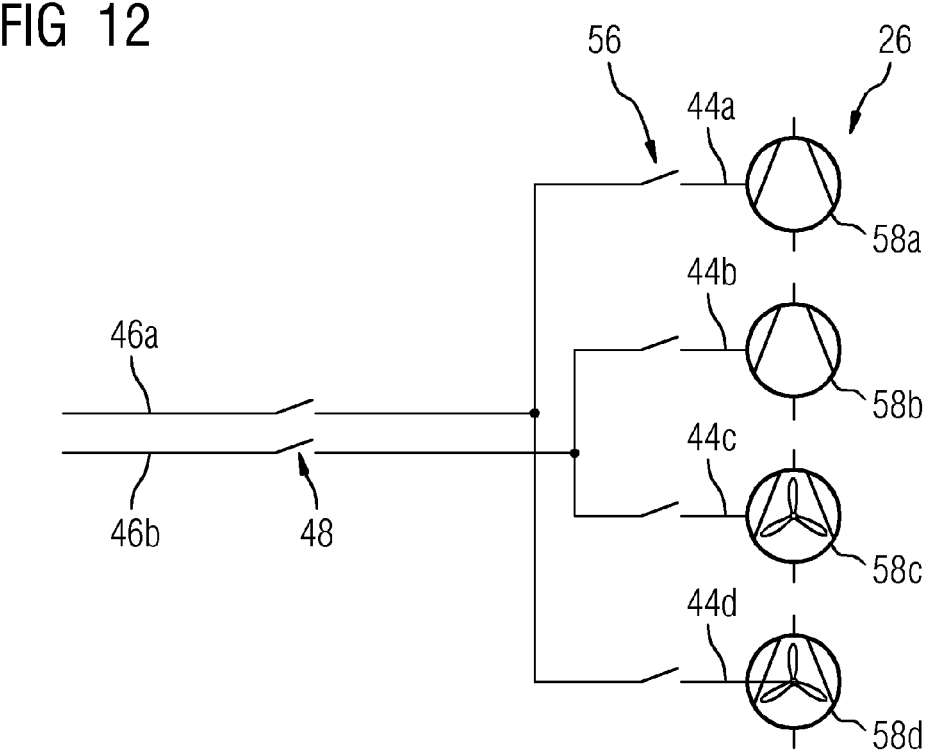

POWER SUPPLY DEVICE FOR A RAIL VEHICLE

BACKGROUND OF THE INVENTION

Field of the Invention

The invention relates to a power supply device for a rail vehicle, which comprises at least one driven car, comprising a DC link, a braking system and an energy supply system for supplying operating energy to the braking system.

In rail vehicles, a distinction is generally drawn between two types of braking, namely service braking and emergency braking, also referred to as quick-response braking or hazard braking. While the service braking is used for reducing the velocity of the train, more restrictive demands are made of the emergency braking so as to ensure greatest possible safety of the passengers, the staff and third parties. In the case of service braking, preferably an electrodynamic brake is used, in which the braking force is generated by the electric motors of the rail vehicle. The electrical energy generated during braking by the motors in generator mode is either converted into heat via a resistor, supplied to auxiliaries or fed back into the grid.

In addition to the electrodynamic brakes, trains generally have a fully-fledged friction brake, in which the braking effect is achieved pneumatically, hydraulically and/or mechanically. The reason for this lies in the excessively low level of fail safety of the electrodynamic brake in comparison with the mechanical brake, with the result that for sufficient braking safety a friction brake should not be dispensed with even in the event of an emergency. This means, however, that a motor car of a train has two fully-fledged braking units, namely the friction brake and the electrodynamic brake. The two braking units have different advantages. While the friction brake ensures greater safety in the event of emergency braking, the regenerative brake has economic advantages. Thus, for example, no wear occurs in the brake linings and brake disks, and the recovered energy can be used and can therefore reduce the total consumption of electricity by the train.

BRIEF SUMMARY OF THE INVENTION

An object of the present invention therefore consists in improving the boundary conditions for safe electrodynamic braking.

This object is achieved by a power supply device of the type mentioned at the outset in which, in accordance with the invention, the energy supply system contains at least two energy supply units arranged on the DC link for the driven car for redundant energy supply to the braking system.

The invention is based on the consideration that, for failsafe operation of an electrodynamic brake, a safe vehicle electrical distribution system supply to the braking system is required. By virtue of the vehicle electrical distribution system supply, energy is supplied to the braking system, which contains, for example, actuation and regulation as well as cooling units for the power components which are required for the electrodynamic braking. In addition, when implementing a safe electrodynamic brake using asynchronous technology, energy can still safely be supplied to a DC-link recharging device in order thus to safely provide the energy for demagnetization of the asynchronous machine in the DC link.

Some of the abovementioned units are connected to the AC train busbar. Operating voltage can be supplied to this train busbar from the DC link via the energy supply system. However, it is also possible for operating energy to be supplied to these units or the braking system directly via the energy supply units. By virtue of the redundant energy supply to the braking system by the two energy supply units, either directly or via the AC train busbar, the safety of the power supply of the braking system with its units necessary for the electrodynamic braking can be increased as much as is necessary for an electrodynamic braking system for implementing emergency braking even without a failsafe mechanical brake.

In particular in the metro sector, an electrodynamic braking system can generate a sufficiently high braking torque within the entire travel velocity range in order to also implement emergency braking. By virtue of the invention, boundary conditions can be provided with a safe power supply, by means of which boundary conditions a sufficiently high degree of operational safety of the electrodynamic brake is achieved. It would thus be possible to dispense with a mechanical braking system for braking the train.

Advantageously, the redundant energy supply to the AC train busbar is performed by the two energy supply units from the DC link. The energy supply units are expediently arranged between the DC link and the AC train busbar.

It is furthermore advantageous if each of the two energy supply units is conditioned and designed for purely supplying energy to the braking system and/or the AC train busbar. If one of the energy supply units fails as a result of a defect, for example, the other of the two energy supply units can supply the braking system on its own, either directly or via the AC train busbar, in such a way that at least all of the units required for emergency braking are supplied sufficient current or operating voltage. It is of course also possible for more than two energy supply units to be provided, which each supply energy to the braking system and/or the AC train busbar.

The power supply device is a power supply device for a rail vehicle, i.e. it is conditioned to supply operating energy to the operating units of a rail vehicle, in particular the drive system, a braking system and expediently all further units to which energy is supplied indirectly or directly from the DC link of the rail vehicle. The power supply is therefore intended for installation in a rail vehicle. Expediently, the power supply device is at least partially arranged in the driven car. In this case, in particular the two energy supply units are advantageously arranged in the driven car.

The braking system expediently comprises a brake cooling unit and/or a brake lifter, in particular all of the units to which energy needs to be supplied in order to be able to perform emergency braking without any damage, possibly apart from the drive motors themselves. An input power converter can be connected on the input side directly to the system voltage of the railroad system. The DC link is expediently a traction DC link, which supplies drive energy to the drive motors of the driven car, in particular via motor converters. The rail vehicle can have, in addition to the AC train busbar, a DC train busbar, which is expediently fed from the AC train busbar. Advantageously, energy is supplied to the vehicle electrical distribution system of the rail vehicle from the DC train busbar.

In an advantageous embodiment of the invention, the power supply device comprises at least two input power converters for the driven car for supplying energy to the DC link. If an input power converter or one of the two energy supply units fails, it can be ensured by virtue of the redundant feed to the AC train busbar by the two input power converters that current is always still supplied to the braking components.

Expediently, the two input power converters are each designed for supplying energy to the DC link, in particular the entire DC link. Each of the two input power converters is therefore conditioned to supply sufficient energy to the DC link even in the event of failure of the other input power converter in order for operating voltage to be supplied reliably at least to the operating units required for emergency braking in order to initiate braking and during braking.

The braking system can be connected to the energy supply units via a braking circuit in order to supply energy to the units of the braking system. The braking circuit can be the AC train busbar or a dedicated braking circuit which is provided in addition to the AC train busbar and can be fed, parallel thereto, by the energy supply units. The braking circuit can be a single, cohesive circuit or have a plurality of circuit segments, which can also be connected in parallel, so that one braking circuit segment supplies operating energy to a first proportion of the braking units and another braking circuit segment supplies operating energy to a second proportion of the braking units.

An advantageous development of the invention provides that the power supply device has an AC train busbar, by means of which operating energy is supplied to the braking system, wherein the two energy supply units are designed for the redundant supply of energy to the AC train busbar.

It is furthermore advantageous if the DC link is likewise provided in redundant form. For this purpose, the DC link can expediently have at least two segments, which are both conditioned for feeding current to the AC train busbar. For this purpose, expediently each of the two segments is connected to the AC train busbar via a dedicated energy supply unit. If one segment of the DC link fails, current can nevertheless still be supplied reliably to the AC train busbar. For this, it is advantageous if the two energy supply units are assigned to in each case one dedicated segment of the DC link and the two segments are disconnected from one another and are used, via the energy supply units, for the redundant energy supply to the AC train busbar. Advantageously, the two segments are each fed by a dedicated input power converter.

A further advantageous variant embodiment of the invention envisages that each input power converter only feeds one of the segments. The power supply device can to this extent be divided into two identical parts, each having a DC-link segment and an energy supply unit, wherein each part can be equivalent in terms of design and power and can replace the other. During conventional operation, each segment feeds an expediently identical part of the drives of the driven car and in each case one of the energy supply units, which are expediently identical in terms of their power.

Furthermore, it is advantageous if the power supply device has two input power converters for the driven car for respectively supplying energy to the entire DC link and in addition a switching means for connecting the two input power converters to at least one of the energy supply units for supplying energy thereto. In this way, this energy supply unit can be fed by the two input power converters so that this energy supply unit can always supply energy to the AC train busbar, even when one of the input power converters fails.

In order to achieve a very high degree of safety of the power supply, it is advantageous to be able to supply power to the AC train busbar in various operating modes, depending on the operating situation. In one of the operating modes, the two segments of the DC link are connected to one another and are fed from the two input power converters. If one of the input power converters fails, the remaining input power converter feeds the entire DC link.

Depending on the existing power of the input power converter, it may be expedient to disconnect the two segments from one another so that, in the event of failure of an input power converter, for example in the event of a DC-link short circuit caused by the input power converter, there is now only one operated segment. For this purpose, the switching means is expediently conditioned for splitting the DC link into two segments, which are disconnected from one another and are fed by in each case one dedicated input power converter, and which each have a dedicated energy supply unit for feeding energy into the AC train busbar.

A further operating mode envisages that although the two segments are disconnected, the two energy supply units can be fed from at least one of the two input power converters. If the other input power converter fails, the segment thereof also fails and it is now only those traction motors of the driven car which are attached to the segment which is fed from the remaining input power converter which are drive-ready. The traction motors attached to the other segment are now out of operation, in any case as regards the drive. However, expediently both energy supply units are connected to the remaining input power converter and can both supply sufficient energy to the AC train busbar. For this purpose, the switching means is provided for connecting the two energy supply units to at least one of the two input power converters when the segments are otherwise disconnected.

In a further advantageous embodiment of the invention, the two energy supply units have different powers. In this case, a more powerful energy supply unit can be conditioned for conventional operation, which energy supply unit feeds the AC train busbar on its own during conventional operation. The weaker energy supply unit can be used for emergency operation. In particular, it can be connected to the AC train busbar in the event of failure of the more powerful energy supply unit. For this purpose, the switching means is expediently provided for connecting the weaker energy supply unit to the two input power converters, either separately or both together. The energy supply unit with the lower power is therefore connectable to both input power converters and the more powerful energy supply unit is designed and conditioned for supplying energy to the AC train busbar on its own during conventional operation.

The safety of the power supply to the operating units required for emergency braking can be increased further if the power supply device has a DC source, which is connected or connectable to at least one of the energy supply units and is designed to supply energy to the AC train busbar via the energy supply unit. The DC source is expediently without a DC link, i.e. at least temporarily independent of a supply through the DC link. The DC source is expediently a DC store and can be a battery or a DC train busbar. Expediently, in this embodiment of the invention, the two energy supply units are designed with different powers and the DC source is connected to the weaker energy supply unit.

In order to brake a train using electrodynamic brakes, the traction motors are used for generating the braking torque. In this case, however, it is advantageous if the cars which are not driven also contribute to the braking and can generate a dedicated braking torque. In this case, however, the braking units of the non-driven cars also need to have a reliable supply of operating voltage. The non-driven cars of the train are generally also supplied operating voltage via a DC train busbar. This can be fed by the AC train busbar via corresponding controlled converters or directly from an input power converter.

In this regard, the invention is directed to a power supply device for a rail vehicle which comprises a plurality of non-driven cars comprising a DC train busbar and an energy supply system for feeding electrical energy into the DC train busbar. It is proposed that the energy supply system contains, in accordance with the invention, at least two energy supply units for redundant energy supply to the DC train busbar. The braking units of the non-driven cars can be supplied operating voltage reliably by this redundant energy supply if one of the energy supply units should fail as a result of a defect.

The energy supply units can each comprise a controlled converter, which is connected between an AC train busbar and the DC train busbar.

The non-driven cars of a rail vehicle should remain capable of braking even when the rail vehicle is unintentionally disconnected during travel. For this purpose, it is advantageous if the energy supply units feeding the DC train busbar are arranged in different cars of the train. Particularly advantageous is the arrangement at the front of the train and at the end of the train, i.e. in the first and last cars of the rail vehicle, so that in the event that the train becomes separated, operating voltage is supplied reliably to both segments of the DC train busbar.

In order to ensure a reliable power supply to each car of the train even in the case of multiple unintentional train separations, it is advantageous if a plurality of cars arranged directly one behind the other, in particular each car of the rail vehicle, i.e. of the entire train, has an energy supply unit for energy supply to the DC train busbar.

In particular in the case of multiple train separations, it may arise that a disconnected train part does not have a connection to the railroad system voltage. External feeding of the DC train busbar is not possible. In order to maintain a reliable power supply to the braking units even in such a case, it is advantageous to have a DC source in addition to the energy supply units, which DC source is conditioned for feeding the DC train busbar. The additional DC source can be fed from a DC bus at the DC-link level or can be a chargeable DC store, such as a battery. Advantageously, the DC store is provided for feeding the DC train busbar in a car without driving.

Furthermore, it is advantageous if the DC store is part of an energy supply unit feeding the DC train busbar.

It is furthermore advantageous if at least some, in particular all of the energy supply units feeding the DC train busbar each have at least one, expediently at least two DC stores. These can be chargeable batteries, to which charging current is supplied by the respective energy supply unit.

Advantageously, the power supply device comprises an AC train busbar. The two energy supply units can be connected to said AC train busbar by means of a parallel circuit. The AC train busbar can also be connected to the two energy supply units. In this way, the power supply to the braking system can take place via the train busbar. As an alternative or in addition, an AC line can be provided, which is fed by at least one of the energy supply units and/or a further energy supply unit and by means of which operating energy is fed to the braking system. To this extent, it is possible to provide further redundancy for the power supply to the braking system, namely by means of an additional AC line, or to conduct the redundant power supply of the braking system only via the AC line.

In addition, an AC line can be provided which is fed by at least one of the energy supply units and/or a further energy supply unit and by means of which operating energy is supplied to the braking system.

Expediently, a plurality of energy supply units are connected in parallel to the AC line. In this case, the rated power of the connected energy supply units is generally rated such that the supply to the AC line can also be maintained by only one of the energy supply units. This may be necessary, for example, in the event of failure of one of the energy supply units. Expediently, in this operating situation sufficient current or operating voltage is supplied to all of the operating units connected to the AC line.

The AC line is physically different than the AC train busbar and can be connected and disconnected thereto and therefrom via one or more switching means, which is/are provided for this purpose.

In order to increase the safety of the power supply further still, a plurality of AC lines for supplying power to the braking system can also be provided. Expediently, at least one of the energy supply units and/or a further energy supply unit is connected to each of the AC lines. For design-related reasons, firstly operating energy can still be supplied to the braking system via the AC line in the event of a defect of the AC train busbar or in the event of a drop in the voltage potential of the AC train busbar below the required rated potential. Such a drop can be caused, for example, by a ground fault or short circuit which has not been eliminated in one of the consumers connected to the AC train busbar. Secondly, in the event of an interruption to the feed to the AC line, the safe energy supply to the braking system can furthermore be ensured via the AC train busbar. An interruption to the feed can occur, for example, as a result of a defect in the energy supply units or the input power converters, which are generally connected to the energy supply units and are conditioned for supplying power to said energy supply units, or in another expedient current source for feeding the AC line.

In an advantageous variant embodiment, the feed to the AC line takes place from two energy supply units, which are connected to the AC line via a parallel circuit. In the event of a defect in one of the two energy supply units, the feed to the AC line can be maintained by the other energy supply unit. It is of course also possible for more than two energy supply units to be provided for this purpose.

The power supply device is advantageously developed by virtue of the fact that a plurality of AC lines are designed for supplying power to the braking system. The supply of operating energy to the AC lines in this case expediently takes place via the two energy supply units, which can be connected to the AC lines in a parallel circuit.

In a further advantageous configuration of the invention, it is proposed that the two energy supply units which are used for feeding the AC train busbar are each connected to one or a single input power converter. Preferably, a further energy supply unit for supplying power to a further AC line is provided and is connected to one or the input power converter of the two other energy supply units.

In another development of the invention, the further energy supply unit can also be connected to more than one input power converter. In this case, the rated power of the further energy supply unit is advantageously such that the supply of operating voltage to the operating units is ensured at least for emergency operation even in the event of failure of the two other energy supply units. The further AC line can in this case be coupling-free, i.e. at least temporarily physically disconnected from the AC train busbar. Advantageously, the arrangement comprises a switching means, which is designed to connect and disconnect the further AC line to and from the braking system.

In the event of a fault, in particular single or multiple separation of the train and/or disconnection of the input power converters from the railroad system voltage can arise. A feed to the energy supply units and therefore to the AC train busbar and the AC lines from outside, for example via the railroad system, is then no longer possible. In order to ensure safe supply of operating energy to the braking system in such a case, it is advantageous to feed at least one energy supply unit of the AC line via a DC source. This DC source can be in the form of a battery, for example.

The DC source can be arranged in a manner free from the DC link, i.e. at least temporarily physically disconnected from the DC link of the power supply device. The AC line can in this case be at least temporarily physically disconnected from the AC train busbar. Furthermore, the AC line can be formed so as to be parallel to another AC line. Advantageously, the arrangement comprises a switching means, which is embodied to connect and disconnect the AC line to and from the braking system.

In accordance with a preferred embodiment of the invention, the operating units of the braking system, such as, for example, the brake cooling unit and the brake lifter, have a redundant design. In this case, the individual operating units are advantageously embodied in such a way that safe braking is ensured even in the event of failure of one or more operating units of the same type.

It is furthermore proposed that each of the redundant operating units has one or more AC feed lines. In this case, the AC feed lines are advantageously designed to connect the braking units to the energy supply to the braking system. Generally, the connection of the AC feed lines to an AC line is performed. In variant embodiments, which advantageously provide more than one AC line, the connection of the AC feed lines can also be to more than one single AC line.

Expediently, each of the operating units is connectable and/or disconnectable to and from the energy supply to the braking system via a switching means. The switching means can in this case be arranged between the AC line and the AC feed line. In this way, a defective operating unit can be disconnected from the energy supply in order to prevent the voltage potential of the energy supply from being reduced to a level which is insufficient for safe supply to the braking systems.

The independence, lack of feedback and availability of the energy supply to the braking system can be further increased by advantageous variant embodiments according to the invention in respect of the connection between the AC lines and the AC feed lines of the operating units.

In an advantageous development of the invention, each of the operating units has a plurality of AC feed lines. Expediently, the number of AC feed lines corresponds to the number of AC lines. In this case, each of the AC feed lines can be connected to one and only one of the AC lines.

A further advantageous variant embodiment envisages that the redundant operating units are split into unit groups, i.e. into subsets of the set of all of the operating units. Expediently, in each case at least one unit of one type, i.e. for example in each case one brake lifter and one brake cooling unit, is represented in each unit group. Advantageously, each of the unit groups is fed by a single AC line. In this case, the number of unit groups corresponds to the number of AC lines and each individual unit is represented only in a single group.

In addition, the invention is directed to a method for supplying power in a rail vehicle, which comprises at least one driven car, in which a DC link supplies operating energy to an energy supply system and said energy supply system supplies operating energy to a braking system.

It is proposed that the energy supply system contains at least two energy supply units for the driven cars, which energy supply units are arranged at the DC link and supply operating energy to the braking system in redundant fashion.

The above description of advantageous configurations of the invention includes numerous features which are reproduced in the individual dependent claims, sometimes grouped together. These features can, however, expediently also be considered individually and be combined in sensible further combinations. In particular, these features can each be combined individually and in any desired suitable combination with the method according to the invention and the apparatus according to the invention.

The above-described properties, features and advantages of this invention and the way in which they are achieved will become clearer and more easily comprehensible from the description below relating to the exemplary embodiments, which are explained in more detail in connection with the drawings. The exemplary embodiments are used for explaining the invention and do not restrict the invention to the combination of features specified therein, even not in relation to functional features. In addition, suitable features of any exemplary embodiment can also be considered explicitly in isolated form, removed from an exemplary embodiment, introduced into another exemplary embodiment in order to supplement this and/or combined with any of the claims.

BRIEF DESCRIPTION OF THE SEVERAL VIEWS OF THE DRAWING

In the drawings:

FIG. 7 shows the power supply device shown in FIG. 1 comprising separate AC lines and a redundant embodiment of the operating units of the braking system, FIG. 8 shows a power supply device as in FIG. 7 comprising a further energy supply unit, FIG. 9 shows a further embodiment comprising a DC source for feeding the third energy supply unit, FIG. 10 shows a variant of the power supply device in which the operating units of the braking system are supplied exclusively from the AC lines, FIG. 11 shows an electrical connection of the operating units from FIG. 7 via separate AC feed lines, and FIG. 12 shows redundant operating unit groups, in each case comprising a dedicated AC feed line.

DESCRIPTION OF THE INVENTION

Figure 1:
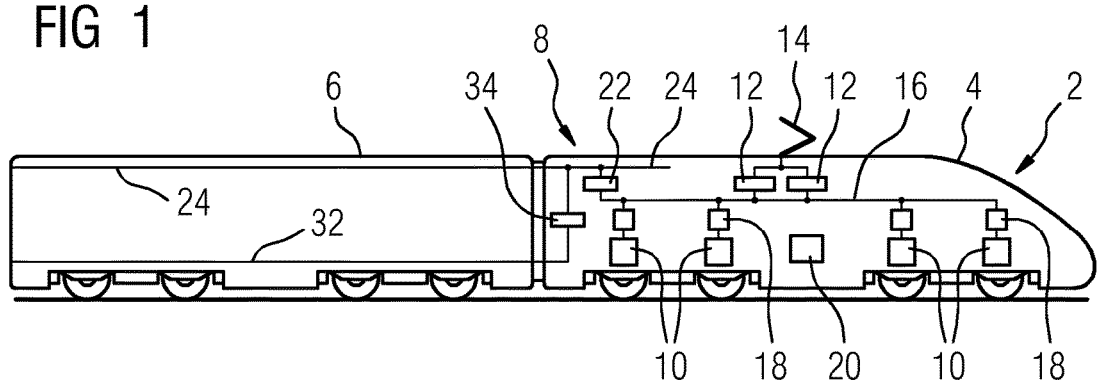
FIG. 1 shows a driven and a non-driven car of a rail vehicle comprising a power supply device.

FIG. 1 shows a schematic illustration of a rail vehicle 2, which has at least one driven car 4 and a plurality of non-driven cars 6, of which, for reasons of clarity, only driven cars 4 and one non-driven car 6 are illustrated. The rail vehicle 2 contains, in the driven car 4, a power supply device 8 for supplying the operating voltage required for operation to the drive motors 10 and the units of the rail vehicle 2.

The power supply device 8 comprises two input power converters 12, which are in the form of controlled converters and are connected to an overhead line of a railroad system via a current collector 14 and possibly a transformer and generate a DC DC-link voltage in a DC link 16 from the system voltage of the overhead line, possibly via a plurality of stages. In general, the DC link 16 does not need to be a voltage DC link, however.

A plurality of motor converters 18, which are in the form of pulse-controlled inverters in the exemplary embodiment here, are electrically connected to the DC link 16. The motor converters 18 convert the DC DC-link voltage into the three-phase AC voltage for the drive motors 10, wherein each of the motor converters 18 supplies in each case one drive motor 10. It is also possible for a motor converter 18 to supply the required operating voltage to a plurality of drive motors 10. The supply of operating voltage to the drive motors 10 is controlled by a control unit 20, which controls the operation of the power supply device 8 and the drive motors 10.

Figure 2:
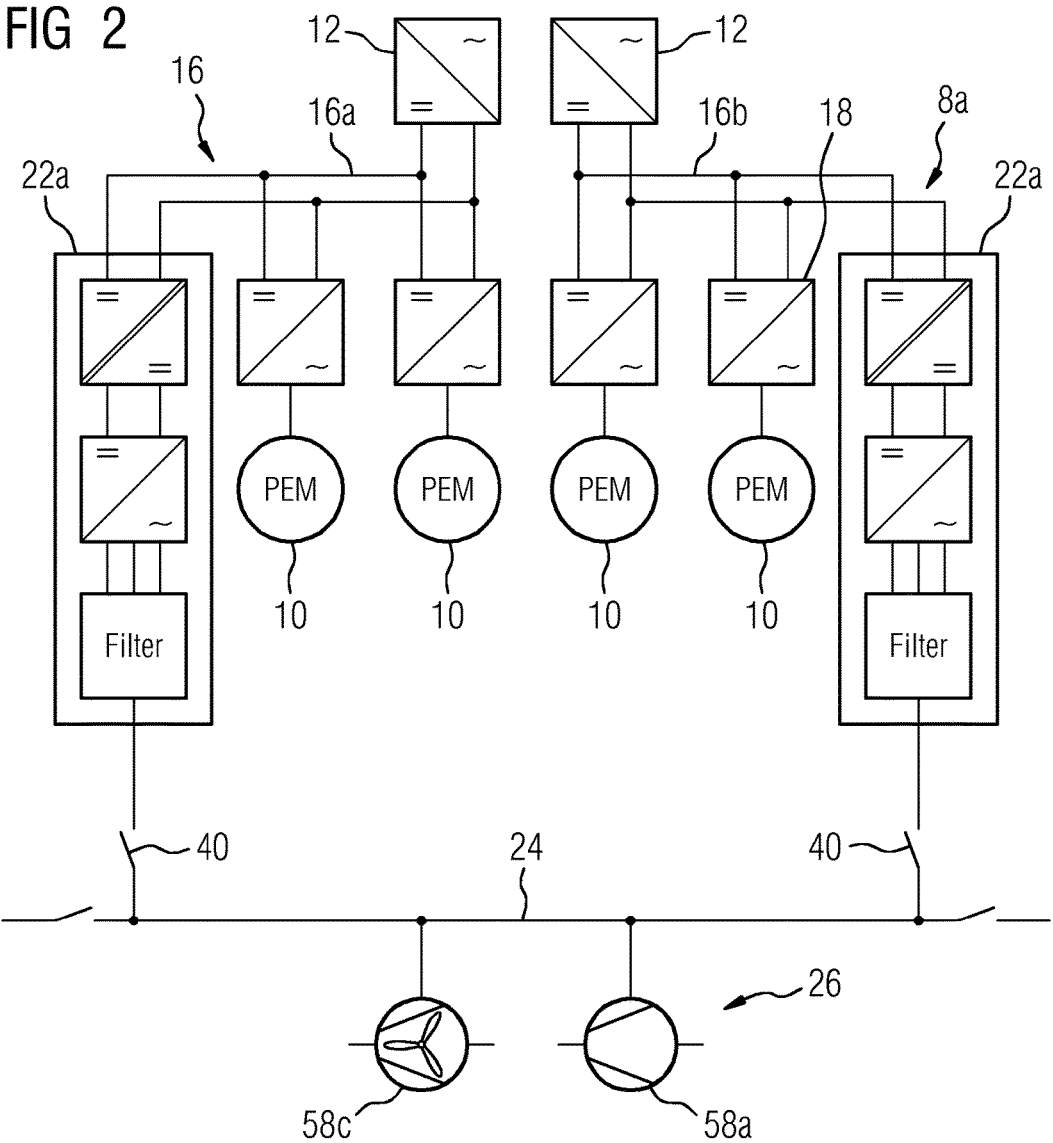
FIG. 2 shows the power supply device shown in FIG. 1 comprising two disconnected DC-link segments.

A more detailed illustration of a detail of the power supply device 8 is illustrated in FIG. 2. The power supply device 8 is denoted in FIG. 2 by the reference symbol 8a. In the figures, components parts which are identical per se but have slight differences, for example in terms of dimensions, position and/or function, are denoted by the same reference numeral and different reference letters. If the reference numeral alone is mentioned without a reference letter, reference is being made to the corresponding component parts of all of the exemplary embodiments. The DC link 16 is split into two segments 16a and 16b, which are disconnected from one another and to which energy is supplied in each case by an energy power converter 12. The two segments 16a and 16b of the DC link 16 are operated independently of one another as two independent and separate DC links. Some of the motor converters 18 are connected to each of the segments 16a, 16b, with the result that some operating energy is supplied to some of the drive motors 10 of the driven car 4 from one segment 16a and to the other of the drive motors 10 from the other segment 16b. In addition, an energy supply unit 22a is connected to each of the segments 16a, 16b, via which energy supply unit operating energy is supplied to an AC train busbar 24 with electrical energy for operating units of a braking system 26 of the driven car 4, in particular the electrodynamic brakes. FIG. 2 shows only two units 58a and 58c that are representative for the operating units in a braking system 26, wherein the two units can be assigned together to a braking system 26 or each unit can be assigned individually to a braking system 26.

Operating energy is supplied twofold, i.e. with redundancy, to the AC train busbar 24 via the two energy supply units 22a. The energy supply units 22a each comprise a DC/DC converter, an inverter and a filter. Alternatively, it would be possible for the energy supply unit 22, parallel to the AC train busbar 24, to supply power to the braking system 26, with the result that said braking system is likewise supplied with redundancy by the two energy supply units 22.

If, during operation of the rail vehicle 2, an energy supply unit 22a fails owing to a defect, the AC train busbar 24 is reliably supplied via the other of the two energy supply units 22a. The same applies to the failure of an input power converter 12, owing to which, in the event of a defect, the entire connected segment 16a, 16b is deenergized, and the other of the two segments 16b, 16a in this case remains in operation, however, and can supply sufficient operating energy to the AC train busbar 24 via the remaining energy supply units 22a.

The two energy supply units 22a are designed in terms of their power such that they can jointly provide sufficient energy for operation of all of the operating units. In the event of a failure of an input power converter 12 or an energy supply unit 22a, less power is available in the AC train busbar 24, for example only half the otherwise available power, if the two energy supply units 22a have the same power. As a result, restricted operation of the operating units of the braking system 26 on the AC train busbar 24 may arise. However, it is always ensured that those operating units 26 which are required for the electrodynamic brake have a sufficient supply.

Figure 3:
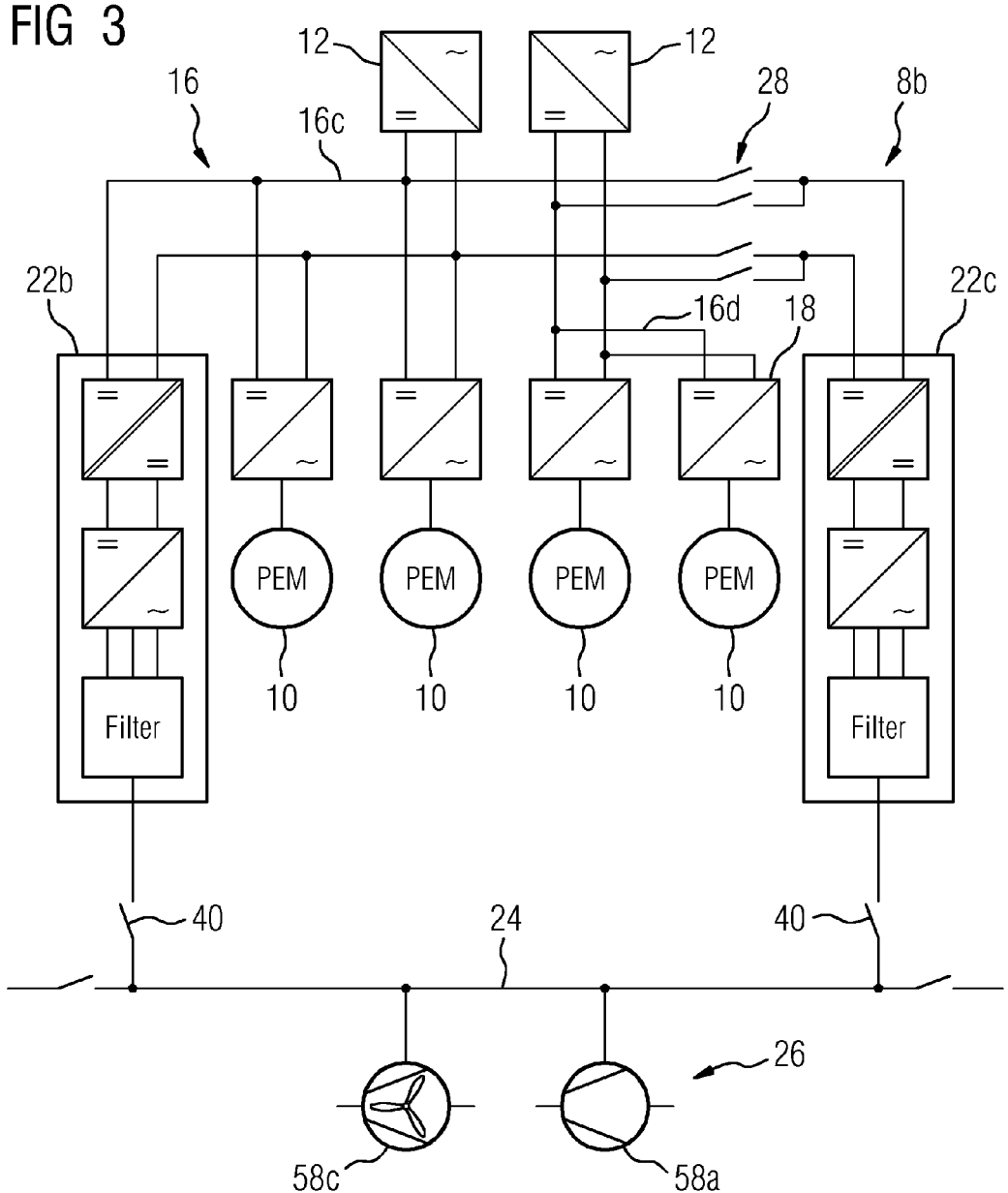
FIG. 3 shows another embodiment of the power supply device comprising connectable segments of the DC link.

A further example of a power supply device 8b is shown schematically in FIG. 3. The descriptions of the following exemplary embodiments are generally substantially restricted to the differences from the preceding exemplary embodiments in the preceding figures, to which reference is made as regards the features and functions which remain the same. Component parts which remain substantially the same are in principle numbered using the same reference symbols and features which have not been mentioned are incorporated in the following exemplary embodiments without being described again.

In contrast to the exemplary embodiment from FIG. 2, the two segments 16c, 16d of the DC link 16 are connected to one another via a switching means 28, by means of which a plurality of operating modes of the power supply device 8b can be connected. The switching means 28 comprises, for this purpose, in each case one switch on both DC phases of both input power converters 12, with the result that four switching states which are essential to operation are switchable.

If the left-hand input power converter 12 is disconnected from the right-hand energy supply unit 22c, i.e. in each case the upper switch in FIG. 3 of a phase of the switching means 28 is opened and the other one is closed, the two segments 16c, 16d are disconnected from one another, with the result that the state shown in FIG. 2 is produced.

If all of the switches are open, in addition to the disconnection of the segments 16c, 16d, the energy supply unit 22c is also disconnected from the two input power converters 12 and therefore out of operation.

If all of the switches are closed, on the other hand, the two segments 16c, 16d are connected to one another, with the result that all of the motor converters 18 and both energy supply units 22b, 22c are supplied jointly by both input power converters 12.

If the upper switch is closed and the lower switch of each of the two phases is open, the left-hand input power converter 12 not only supplies the segment 16a of the DC link 16, but also the energy supply unit 22c. The remainder of the right-hand segment 16d of the DC link 16 is disconnected from the left-hand input power converter 12 and the segment 16c and is supplied by the right-hand input power converter 12.

The two energy supply units 22b, 22c can be designed to have different powers, wherein the power of the energy supply unit 22b on its own is sufficient to supply the AC train busbar 24 and all of the operating units of the braking system 26 connected thereto in any conventional operating situation. During conventional operation of the rail vehicle 2, therefore, the switching means 28 is open, with the result that all of the switches of the switching means 28 are open. In this operating state, the left-hand input power converter 12 supplies the left-hand DC-link segment 16c, and the right-hand input power converter 12 supplies only the two motor converters 18 on the right-hand side, or the right-hand DC link 16d with the drive motors 10 connected thereto. The right-hand energy supply unit 22c is out of operation. Operating energy is therefore only supplied to the AC voltage train busbar 24 by the more powerful energy supply unit 22b.

If the more powerful energy supply unit 22b fails owing to a defect, the control unit 20 switches the switching means 28 in such a way that the energy supply to the AC train busbar 24 takes place exclusively via the less powerful energy supply unit 22c. This can take place by virtue of the fact that all of the switches are closed and the two DC-link segments 16c, 16d are interconnected. It is likewise possible to close the upper switch and to keep the lower switch open, with the result that the less powerful energy supply unit 22c is also supplied by the left-hand input power converter 12. It is likewise possible for the upper switch to be kept open and for the lower switch to be closed, with the result that the energy supply unit 22c is supplied by the right-hand input power converter 12.

If one of the two input power converters 12 fails, the less powerful energy supply unit 22c can optionally be supplied by the remaining input power converter 12 by virtue of the upper switch being closed and the lower switch being open and the left-hand input power converter 12 supplying the energy supply unit 22c or the upper switch being open and the lower switch being closed, with the result that the right-hand input power converter 12 supplies the energy supply unit 22c. This is particularly advantageous if one of the input power converters 12 and the more powerful energy supply unit 22b fail.

This ensures that operating energy is even reliably supplied to the AC train busbar 24 when at least one input power converter 12 and one energy supply unit 22b, 22c are intact. If the AC train busbar 24 is only supplied by the less powerful energy supply unit 22c, there is possibly insufficient energy for all of the operating units connected to this busbar. However, enough power is present to supply sufficient energy to the operating units of the braking system 26 which are required for electrodynamic emergency braking.

Figure 4:
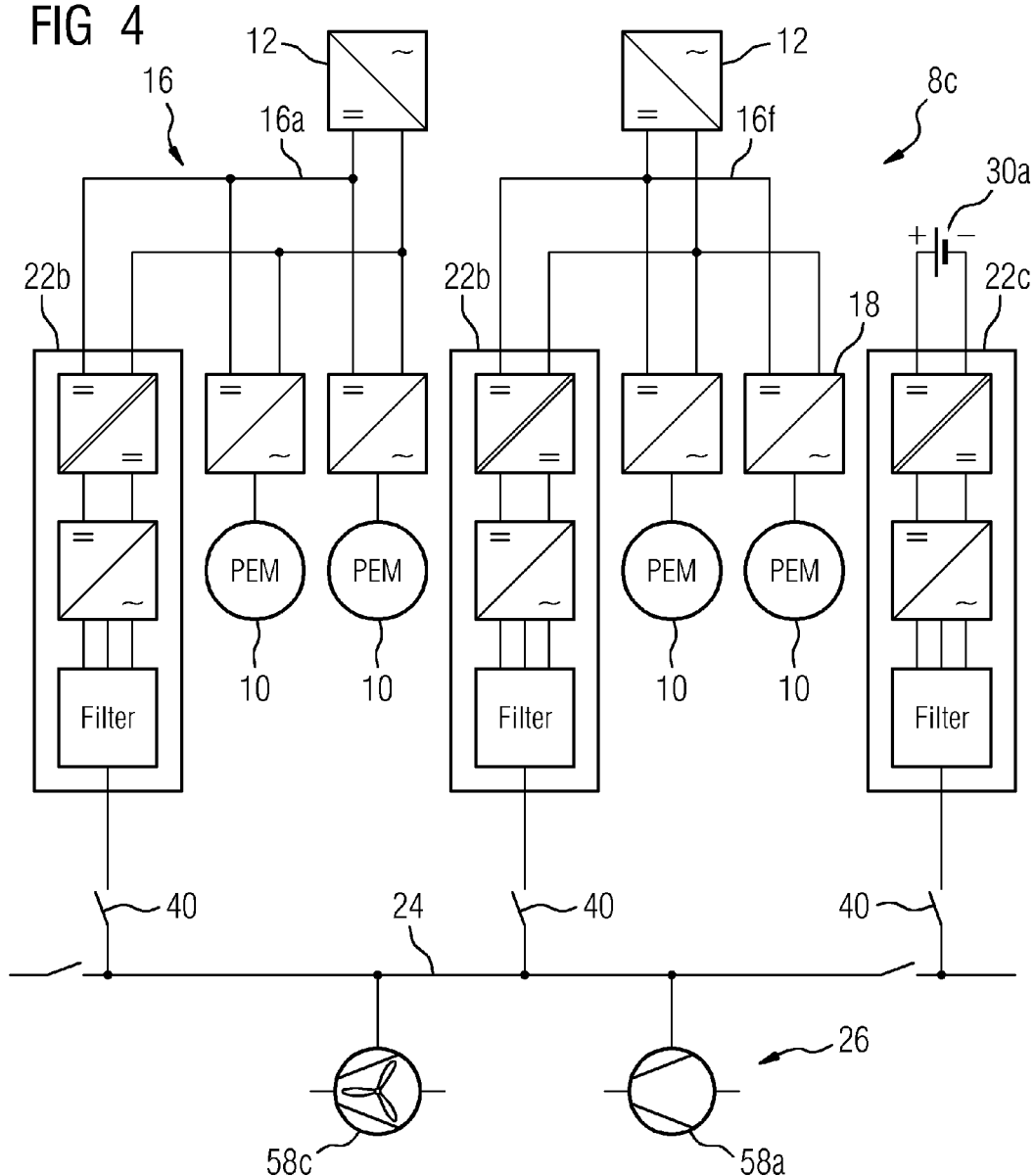
FIG. 4 shows a further embodiment comprising a DC store for feeding an AC train busbar.

A further exemplary embodiment of a power supply device 8c is illustrated in FIG. 4. In contrast to the previous exemplary embodiments, energy is supplied to one of the energy supply units 22c via a DC source 30a in the form of a battery. This exemplary embodiment has the advantage that operating energy for at least the operating units of the braking system 26 which are required for the electrodynamic braking is supplied to the AC train busbar 24 even when the entire DC link 16 is deenergized, for example because no energy can be called up from the railroad system or both input power converters 12 are defective. The DC source 30a is free of the DC link, i.e. can be used independently of a DC link 16. Instead of the battery, it is also possible for a DC train busbar to be used as DC source 30a. This DC train busbar would need to be operated in the event of failure of the DC link 16 with at least one DC store in another car or attached to a busbar of another driven car.

Figure 5:
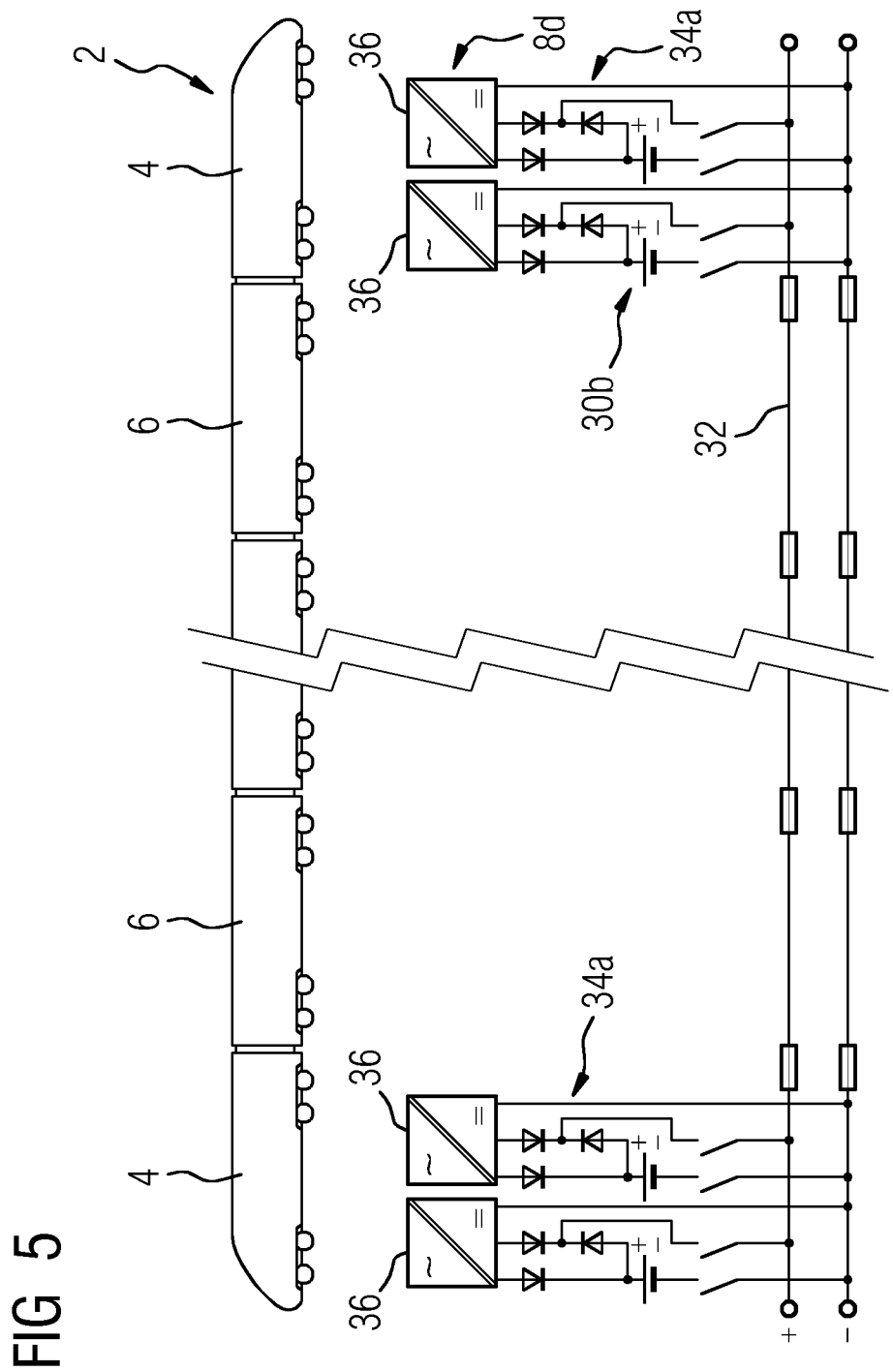
FIG. 5 shows a DC train busbar of a train comprising a plurality of non-driven cars, which are fed by two energy supply units.

FIG. 5 shows the rail vehicle 2 comprising two driven cars 4 and a plurality of non-driven cars 6. The rail vehicle 2 has a DC train busbar 32, which extends through the entire rail vehicle 2, i.e. all of the cars 4, 6. Direct current is supplied to the DC train busbar 32, which is passed through the train and is also illustrated in FIG. 1, at the front end of the train and at the rear end of the train by two energy supply units 34a, said DC train busbar supplying operating current to operating units (not illustrated) of the non-driven cars 6. The energy supply units 34a, which are each part of a power supply device 8d, each comprise two controlled converters 36, which each feed energy into the DC train busbar 32 with redundancies. The power of the controlled converters 36 is rated such that operating energy can be supplied to all of the operating units of the non-driven cars 6 if the DC train busbar 32 is supplied by at least two controlled converters 36. In particular, the power of the controlled converters 36 is sufficient to be able to supply the operating units of the non-driven cars 6 which are required for emergency braking even only by means of one controlled converter 36.

In the case of a single train separation, the DC train busbar 32 is ripped into two parts, but these two parts are fed from an energy supply unit 34a in any possible variation of the single train separation. In this way, the braking units of the non-driven cars 6 always remain fully functional even in the case of a single train separation.

For the case where the controlled converters 36 do not receive energy on the input side, for example owing to a technical defect in the rail vehicle 2, all of the energy supply units 34a are equipped with at least two DC stores 30a, by means of which sufficient operating energy can be supplied at least to the braking units of the non-driven cars 6. In this case, each controlled converter 36 is connected to a DC store 30a, with the result that each of the energy supply units 34a has two segments, each having a controlled converter 36 and a DC store 30a.

Figure 6:
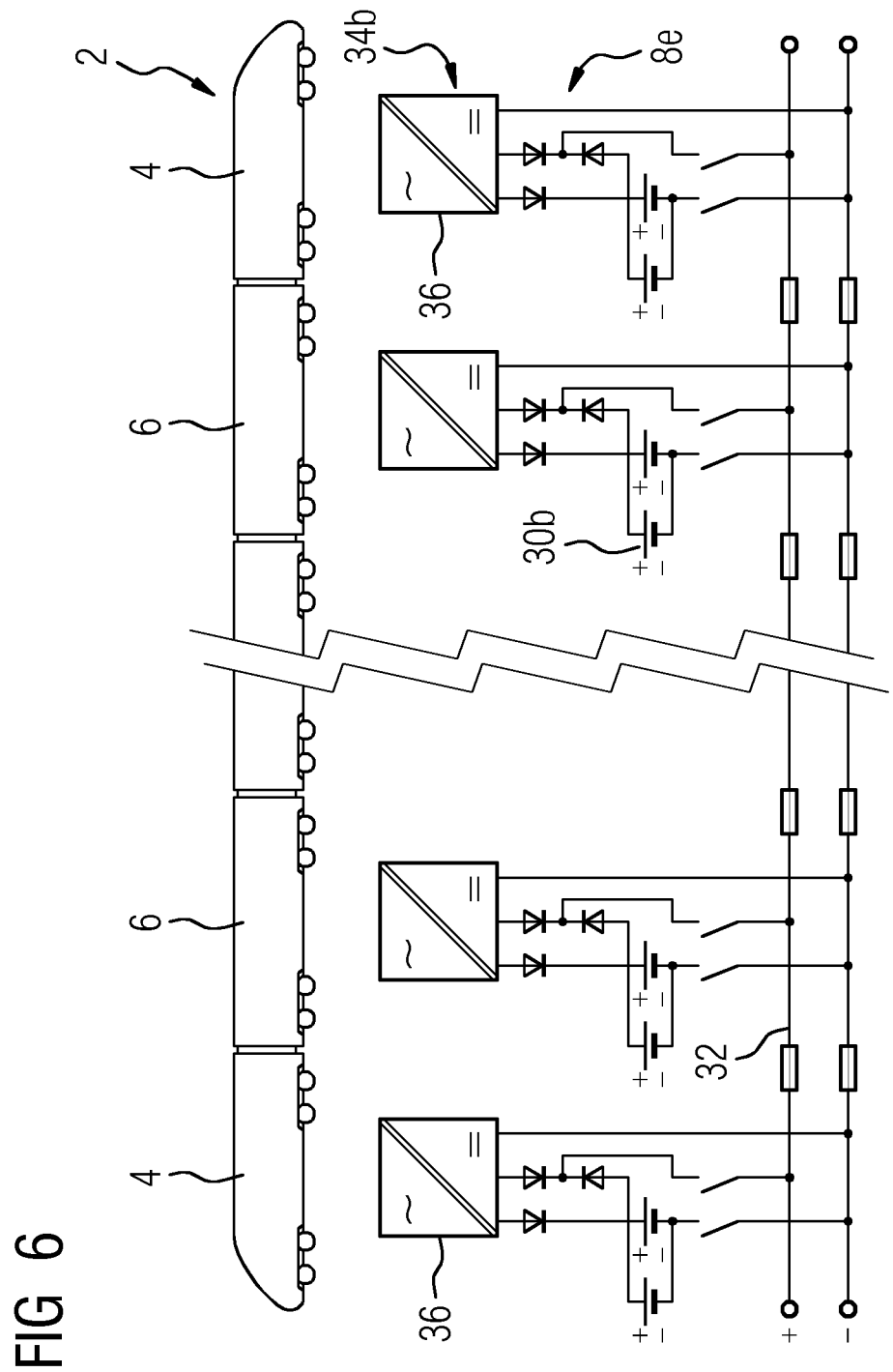
FIG. 6 shows a DC train busbar, which is fed from each car by an energy supply unit.

In the exemplary embodiment shown in FIG. 6, each non-driven car 6 of the rail vehicle 2 is provided with an energy supply unit 34b, wherein the power thereof should be rated such that said energy supply units can in pairs, in particular even on their own, can supply all of the operating units of the respective car 4, 6 which are connected to the DC train busbar 32. A surplus power is advantageous, with the result that operating energy can be supplied to the DC train busbar 32 with multiple redundancy by a plurality of energy supply units 34b.

Owing to the fact that each non-driven car 6 is equipped with an energy supply unit 34b, this energy supply to the operating units is in any case ensured even in the case of a multiple train separation, irrespective of the location or locations of the train separation. In order to have operating energy available for braking units even in the event of a system failure or a DC-link failure, each energy supply unit 34b is equipped with two DC stores 30a, similar to in FIG. 5, which either on their own or jointly make available sufficient power for the units required for the braking.

The controlled converters 36 from the two exemplary embodiments in FIGS. 5 and 6 can be connected on the input side to the AC train busbar 24 of the power supply device 8. It is likewise possible for the DC train busbar 32 to be fed directly from the DC link 16 and for a corresponding power converter to be connected between the DC link 16 and the DC train busbar 32. Said corresponding power converter would then expediently be a buck converter.

The power supply devices 8a, 8b and 8c can each readily be combined with the power supply device 8d or 8e, with the result that a power supply device 8 comprising energy supply units 22 and energy supply units 34 is provided.

A further exemplary embodiment is illustrated schematically in FIG. 7. In contrast to the previous exemplary embodiments, the power supply device 8f has an AC line system 38, which is connected to the operating units 58a-d of the braking system 26 and can have one or more AC lines 38a, 38b. The line system 38 shown in FIG. 7, comprises two AC lines 38a, 38b in a parallel circuit, which each connect one of the two energy supply units 22a to the operating units 58a-d of the braking system 26.

A switching means 42 is provided in each of the two AC lines 38a, 38b. An AC branch line 60 branches off from the AC train busbar 24, which passes through the entire train. Said AC branch line is coupled to the AC line system 38 via a switching means 54. The two energy supply units 22a are connected to the AC train busbar 24 in each case in individually connectable and disconnectable fashion via a switching means 40. The connection of the AC line system 38 to the energy supply units 22a remains uninfluenced by the switching means 40 owing to the structural arrangement. Each individual one of the operating units 58a-d of the braking system 26 has a single AC feed line 44a-d, which is connected via a switching means 56 to the AC line system 38. The operating units 58a-d of the braking system 26 have redundancy, and there are therefore two coolant pumps 58a and 58b and two fans 58c and 58d.

If one of the energy supply units 22a fails owing to a defect, the control unit 20 disconnects the relevant energy supply unit 22a from the operating units 58a-d of the braking system 26. This takes place via the actuation of the switching means 42 in the AC lines 38a and 38b. In this case, the AC line 38a or 38b coupled to the defective energy supply unit 22a is disconnected from the operating units 58a-d. The AC line 38a or 38b of the intact energy supply unit 22a is or remains in this case connected to the operating units 58a-d by the switching means 42. This ensures that the energy supply to the braking system 26 is maintained in the event of failure of one of the two energy supply units 22a. For this purpose, the rated power of the energy supply units 22a illustrated in FIG. 7 is identical to in each case a/2 kVA, i.e. half the main rated power of a kVA, and is rated such that the sufficient operating energy can be supplied to the braking system 26 by only one single energy supply unit 22a, even during normal operation.

If both energy supply units 22a fail, it may be that current is available at least for emergency operation of another railcar via the AC train busbar 24, which passes through the entire train. In order to make use of this, the switching means 54 is closed and the switching means 40 and 42 are opened. By actuating the switching means 40 and 42, the energy supply units 22a are disconnected from the AC train busbar 24 and the AC line 38. By actuation of the switching means 54, a connection is produced between the AC train busbar 24 via the AC branch line 60 and the AC line 38.

A functionally identical arrangement which is alternative in design terms can provide two additional switching means instead of the AC branch line 60 and the switching means 54. These two additional switching means can in each case be arranged between the relevant energy supply unit 22a and the connection of the AC lines 38a and 38b to a connecting line from the relevant energy supply unit 22a to the train busbar 24. If both energy supply units 22a fail, the additional switching means are opened and the switching means 40 is closed, with the result that the feed to the operating units 58a-d of the braking system 26 can take place from the AC train busbar 24 via one or both AC lines 38a and/or 38b.

A defective operating unit 58a-d is disconnected from the AC line 38 by the switching means 56. This prevents the rated potential of the AC train busbar 24 or the AC line 38 being drawn to a much lower potential which is insufficient for supplying the braking system 26.

FIG. 8 shows a further exemplary embodiment of a power supply device 8g. As a variation from the embodiment illustrated in FIG. 7, the power supply device 8g has a further energy supply unit 22d. The energy supply unit 22d is provided in addition to the two energy supply units 22a and is connected to the operating units 58a-d of the braking system 26 via a further AC line 46. Furthermore, a switching means 48 for connecting and disconnecting the connection between the energy supply unit 22d and the operating units 58a-d of the braking system 26 is arranged on the AC line 46.

As in the preceding exemplary embodiments, previously described features are incorporated here as well. Thus, for example, the arrangement of the energy supply units 22a, the AC train busbar 24, the AC lines 38 and the AC branch line 60 is configured in terms of its effect on the supply to the operating units 58a-d of the braking system 26 similarly to the variant embodiment illustrated in FIG. 7. The same applies to the switching means 40, 42 and 54.

Two DC-link segments 16g and 16h are arranged between the input power converters 12 and the energy supply units 22a. The two input phases of the inverter of the energy supply unit 22d are connected to the DC phases of the input power converters 12 via a switching means 28, as a result of which a plurality of operating modes of the power supply device 8g can be selected. The switching means 28 has in each case one switch on each of the two DC phases of the two input power converters 12, with the result that four switching states which are essential to operation can be connected:

If all of the switches of the switching means 28 are closed, the feed to the energy supply unit 22d takes place jointly by both input power converters 12.

If, on the other hand, all of the switches of the switching means 28 are open, the energy supply unit 22d is disconnected from the two input power converters 12 and is out of operation.

If the two upper switches of the switching means 28 are closed and the lower switches are open, the left-hand input power converter 12 feeds the energy supply unit 22d in addition to the segment 16g of the DC link 16.

If the two lower switches of the switching means 28 are closed and the upper switches are open, the right-hand input power converter 12 feeds the energy supply unit 22d in addition to the segment 16h of the DC link 16.

If defects occur in one of the two input power converters 12, the control unit 20 switches the switches of the switching means 28 in such a way that the inputs of the energy supply unit 22d are connected to the positive and negative terminals of the intact input power converter 12 and are disconnected from those of the defective input power converter 12.

If both of the input power converters 12 fail as a result of defects or systematic software faults, all of the energy supply units 22a and 22d are out of operation and the control unit 20 opens the switching means 40, 42, 48 and closes the switching means 54. This ensures that operating energy is supplied to the operating units 58a-d by the AC train busbar 24. The AC train busbar 24 passes through the entire train and is therefore also intended to maintain the energy supply to the operating units 58a-d of the braking system 26 in the event of a defect in the energy supply units 22a and 22d and/or the input power converters 12.

A failure of the AC train busbar 24 can occur in particular in the undesired case of a single or double train separation. The safe energy supply to the operating units 58a-d of the braking system 26 which is required for electrodynamic emergency braking is also ensured in the case of simultaneous failure of the energy supply devices 22*a* and the AC train busbar 24. This applies if at least one input power converter 12 and the power supply device 22 are in a functional state.

For this purpose, the rated power of the energy supply units 22*a* illustrated in FIG. 8 is identical to in each case a/2 kVA and is rated such that sufficient operating energy can be supplied to the operating units 58*a-d* of the braking system 26 by only one single energy supply unit 22*a*, even during normal operation. The rated power of the energy supply unit 22*d* can, owing to the structurally provided redundancy of the power supply, can be designed purely for the energy requirement of the operating units 58*a-d* of the braking system 26 during emergency operation and can thus have a much lower rating, for example a/10 kVA.

A further exemplary embodiment of a power supply device 8*h* is illustrated schematically in FIG. 9.

The arrangement of the energy supply unit 22*a*, the AC train busbar 24, the AC lines 38 and the AC branch line 60 is configured similarly to the variant embodiment illustrated in FIG. 7 in terms of its effect on the supply to the braking system 26. The same applies to the switching means 40, 42 and 54.

In addition, a DC source 30*a* for feeding a further energy supply unit 22*c* is arranged. The energy supply unit 22*c* is connected to the operating units 58*a-d* of the braking system 26, connectably and disconnectably via an AC line 46 and a switching means 48.

The DC source 30*a* can be used free of a DC link, i.e. at least temporarily independently of the segments 16*a* and 16*b* of the DC link 16 which are fed from the input power converters 12. The DC source 30*a* can be in the form of a battery, for example. In an alternative embodiment, the DC source 30*a* can be connected to the DC train busbar 32, for example for the purpose of electrical charging or recharging of said DC source.

The exemplary embodiment illustrated in FIG. 9 has the advantage that safe energy supply to the operating units 58*a-d* is ensured even in the event of a defect in the two input power converters 12 and in the case of simultaneous failure of the AC train busbar 24. The control unit 20, in such a fault case, switches the switching means in such a way that the switching means 48 are closed, the switching means 40, 42 and 52 are open. Operating energy is then supplied to the braking system by the energy supply unit 22*c* alone. The rated power of the energy supply unit 22*c* can in this case be selected such that it is sufficient, in the event of a fault, for supplying the braking system 26 and is restricted, for example, to a/10 kVA. The rated power of the energy supply units 22*a* can be, for example, a/2 kVA, with the result that safe supply to the AC train busbar 24 is ensured.

FIG. 10 shows a further exemplary embodiment of a power supply device 8*i* comprising three redundant energy supply units 22*a* and 22*d*. In this case, the energy supply unit 22*a* is connected to an input power converter 12, which also feeds a DC link 16*i*, and is designed for supplying the AC train busbar 24. A switching means 40 is arranged for disconnecting and connecting the power supply unit 22*a* from or to the AC train busbar 24. A further input power converter 12 is connected to a DC link 16*j*.

The two further energy supply units 22*d* are coupled to the operating units 58*a*-58*d* of the braking system 26 in order to supply operating energy to said operating units via AC lines 46*a* and 46*b*. In this case, each of the energy supply units 22*d* is connected to a single one of the AC lines 46*a* and 46*b*. Each of the AC lines 46*a* and 46*b* is also only connected to a single one of the energy supply units 22*d*. Furthermore, a switching means 48 for connecting and disconnecting the coupling between the energy supply units 22*d* and the operating units 58*a-d* of the braking system 26 is arranged on each of the AC lines 46*a* and 46*b*.

The two energy supply units 22*d* are connected to the two input power converters 12 disconnectably and connectably via a switching means 50. In this case, the physical arrangement is such that in each case one of the energy supply units 22*d* is fed by a single one of the input power converters 12. Each of the input power converters 12 also only feeds a single one of the energy supply units 22*d*.

By virtue of this type of connection between the input power converters 12 and the energy supply units 22*d*, three switching states which are essential to operation of the switching means 50 result:

If the two upper switches of the switching means 50 are closed and the lower switches are open, the left-hand input power converter 12 feeds the energy supply unit 22*d* in addition to the segment 16*i* of the DC link 16.

If the two lower switches of the switching means 50 are closed and the upper switches are open, the right-hand input power converter 12 feeds the energy supply unit 22*d* in addition to the segment 16*j* of the DC link 16. If all of the switches of the switching means 50 are closed, the feed to the two energy supply units 22*d* is performed jointly by both input power converters 12.

If defects occur in one of the two input power converters 12, the control unit 20 switches the switches of the switching means 50 in such a way that the inputs of the energy supply units 22*d* are connected to the positive and negative terminals of the intact input power converter 12 and are disconnected from those of the defective input power converter 12. For this purpose, the rated powers of the two energy supply units 22*d* are each rated for sufficient supply to the operating units 58*a-d* of the braking system 26 during normal operation and are provided with in each case a/4 kVA, for example. The rated power of the energy supply unit 22*a* can be, for example, a kVA, with the result that safe supply to the AC train busbar 24 is ensured.

In order to increase the safety of the power supply further still, in an alternative embodiment each of the energy supply units 22*d* can be connected to each of the input power converters 12.

An illustration of an alternative, redundant power supply of the operating units 58*a-d* which can also be used in the power supply devices 8 shown in FIGS. 7 to 10 is illustrated in FIG. 11.

Each individual one of the operating units 58*a-d* is connected to the AC lines 46*a* and 46*b* via in each case two AC feed lines 44 and 52. In this case, each of the AC feed lines 44 is connected to one and only one of the AC lines 46*a* or 46*b*. Each of the AC feed lines 52 is also connected to one and only one of the AC lines 46*a* or 46*b*. Furthermore, the AC feed lines 44 and 52 are connected to in each case one other AC line 46*a* or 46*b*.

The independence, freedom from feedback, and redundancy obtained thereby increases the availability of the energy supply in comparison with the connection of the operating units 58*a-d* via in each case one single AC feed line, which is connected to each of the AC lines, detailed in FIGS. 7 to 10.

Alternatively, the invention can also be developed in that more than the two AC feed lines 44 and 52 are provided per operating unit 58 and more than the two AC lines 46*a* and 46*b* are provided for the connection.

FIG. 12 shows a further variant embodiment of the power supply device 8. In this exemplary embodiment, the operating units 58a-d of the braking system 26 are split into two unit groups, i.e. subsets from the totality of all of the operating units 58. Each of the two subsets with the elements 58a and 58d or 58b and 58c is connected to one and only one of the AC lines 46a or 46b. Each of the AC lines 46a and 46b is also only connected to a single one of the unit groups. By virtue of this type of connection, despite the restriction placed on a single AC feed line 44a-d per operating unit 58a-d, there is increased availability of the energy supply. If one of the AC lines 46a or 46b fails owing to a defect, the energy supply to the operating units 58a-d of the braking system 26 can be maintained by the other AC line.

The invention claimed is:

1. A power supply device for a rail vehicle with at least one driven car and a braking system, comprising:
    a DC link and an energy supply system for supplying operating energy to the braking system; and
    an AC train busbar for supplying operating energy to the braking system;
    said energy supply system including at least two energy supply units for the at least one driven car connected on said DC link for redundant energy supply to the braking system;
    said at least two energy supply units configured for redundant energy supply to the AC train busbar; and
    said DC link having at least two segments and each of said at least two energy supply units assigned to a dedicated said segment of said DC link, and said two segments disconnected from one another and used, via said energy supply units for redundant energy supply to said AC train busbar.

2. A power supply device for a rail vehicle with at least one driven car and a braking system, comprising:
    a DC link and an energy supply system for supplying operating energy to the braking system, said energy supply system including at least two energy supply units for the at least one driven car connected on said DC link for redundant energy supply to the braking system; and
    two input power converters for the driven car for respectively supplying energy to an entire said DC link and a switching device for connecting said two input power converters to at least one of said energy supply units for supplying energy thereto;
    wherein said switching device is configured for splitting said DC link into two segments, which are disconnected from one another, are each fed by an input power converter and each have an energy supply unit, and for connecting said two energy supply units to at least one of said two input power converters when said segments are otherwise disconnected.

3. The power supply device according to claim 2, wherein said energy supply unit with a relatively lower power is connected to at least two input power converters and a relatively more powerful said energy supply unit, during regular operation, is configured and conditioned only for supplying energy to an AC train busbar for supplying operating energy to the braking system.

4. A power supply device for a rail vehicle with at least one driven car and a braking system, comprising:
    a DC link and an energy supply system for supplying operating energy to the braking system, said energy supply system including at least two energy supply units for the at least one driven car connected on said DC link for redundant energy supply to the braking system;
    a DC train busbar, said energy supply system including at least two energy supply units for redundant energy supply to said DC train busbar; and
    a DC source configured for feeding said DC train busbar, or each of said energy supply units feeding said DC train busbar having at least two DC storage devices.

5. A power supply device for a rail vehicle with at least one driven car and a braking system, comprising:
    a DC link and an energy supply system for supplying operating energy to the braking system, said energy supply system including at least two energy supply units for the at least one driven car connected on said DC link for redundant energy supply to the braking system;
    an AC train busbar having said at least two energy supply units connected thereto by way of a parallel circuit, and a number of AC lines connected to the braking system for supplying operating energy to the braking system, wherein said energy supply units are connected to said AC lines by way of a parallel circuit, and further comprising a switching device for selectively connecting and disconnecting the number of AC lines to or from said AC train busbar; and
    at least set of limitations selected from the group consisting of a set (1) and a set (2);
    wherein the set (1) requires that each of said energy supply units is connected to a dedicated input power converter and comprising a further energy supply unit connected to one of said input power converters of one of said energy supply units, and connected to the braking system via a further AC line without any coupling to said AC train busbar by way of a switching device, and wherein said further energy supply unit is configured for redundant energy supply to the braking system; and
    wherein the set (2) requires that a further energy supply unit is fed from a DC storage device without a DC link and is connected to the braking system via a further AC line, without coupling to said AC train busbar, by way of a switching device, and wherein said further energy supply unit is configured for redundant energy supply to the braking system.

* * * * *